Feb. 3, 1948.  H. G. WHITMORE  2,435,256
HOLE LOCATING AND DRILLING DEVICE
Filed May 10, 1944  2 Sheets-Sheet 1
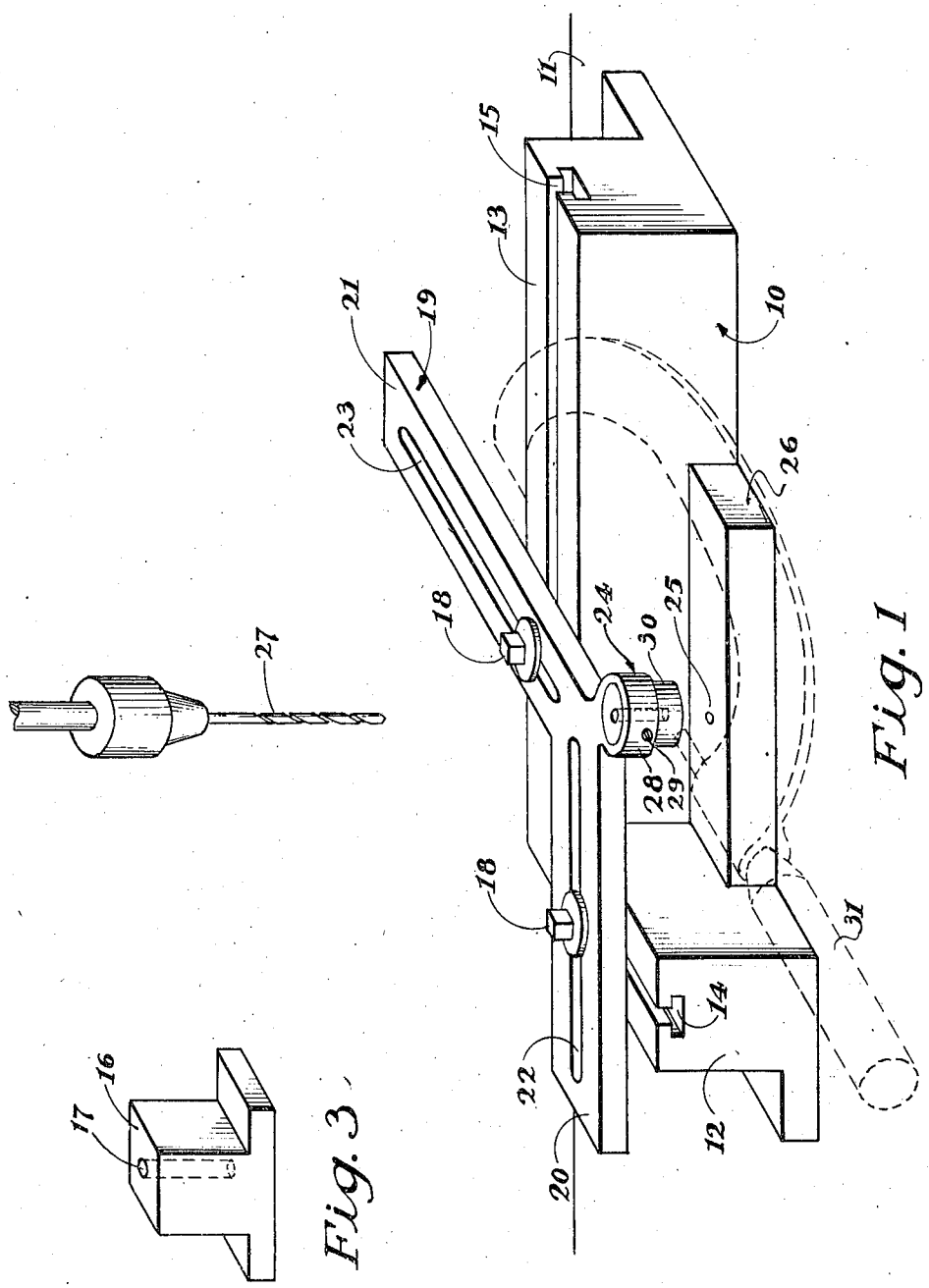
INVENTOR.
Henry G. Whitmore
BY
Spear, Rawlings & Spear
ATTORNEYS

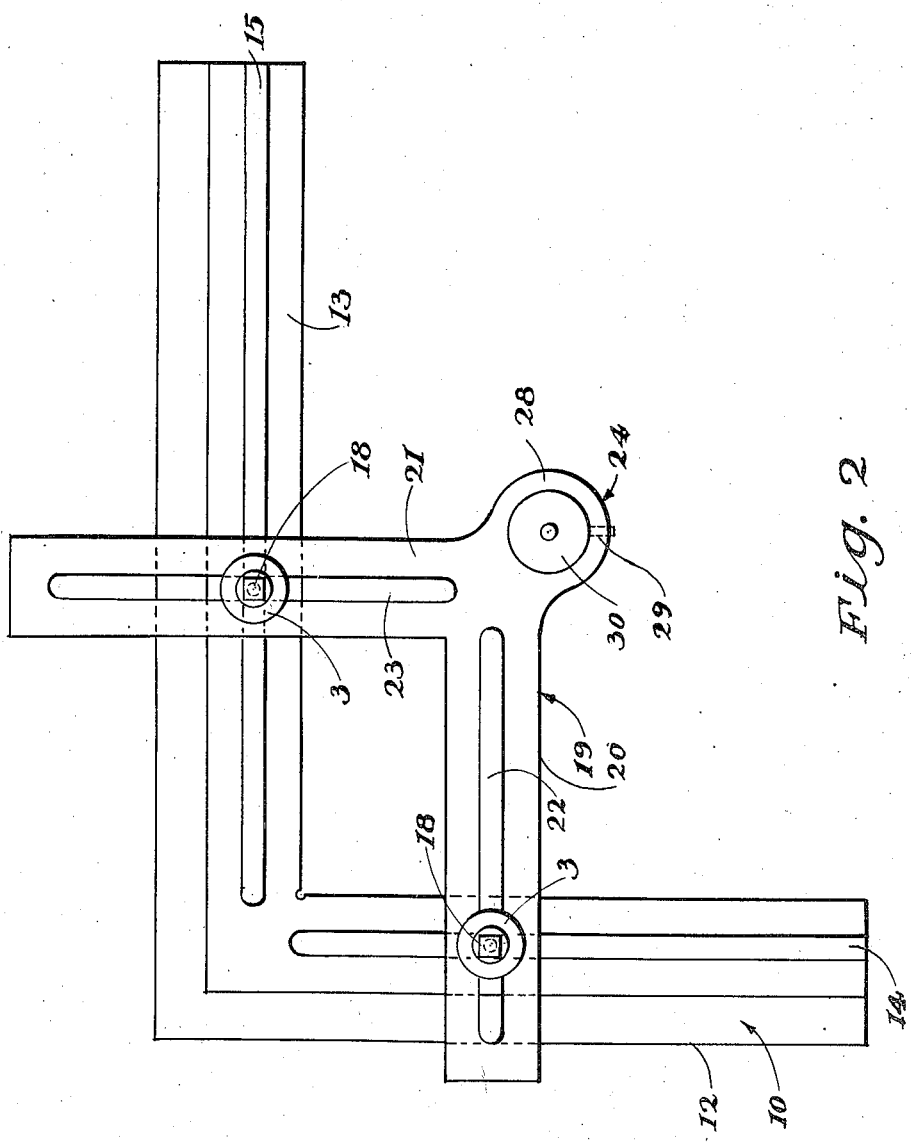

Patented Feb. 3, 1948

2,435,256

UNITED STATES PATENT OFFICE 2,435,256

HOLE LOCATING AND DRILLING DEVICE

Henry G. Whitmore, Newburyport, Mass., assignor to Samuel C. Brody, Newton Centre, Mass.

Application May 10, 1944, Serial No. 535,002

3 Claims. (Cl. 77—62)

This invention relates to devices for locating and drilling holes to exact dimensions in a piece of work, and is designed to be used with any machine capable of drilling holes, such as a jigborer, lathe, boring mill, or milling machines.

Heretofore when using such machines it has always been necessary to fasten the work to the machine and rough-drill the first hole in the work and (except for the lathe) afterwards to move the machine relative to the work in order to locate succeeding holes.

Instead of having the drill strike the work at some point located by the machine itself, my device makes it possible to so locate the point on the work where a hole is to be drilled that the drill will be positively guided to such point.

A characteristic embodiment of my device comprises a lower member to be clamped to or near the work and having a pair of right-angled arms, and an upper member having a pair of angularly disposed arms assembled to the arms of the lower member for adjustment relative thereto longitudinally and transversely over the work, the junction of the arms of the upper member being positioned above the space defined by the arms of the lower member. I provide the members with interengaging means for permitting longitudinal adjustments of the upper member with respect to the lower member and for holding the upper member in its adjusted position with respect to the lower member.

The upper member is further provided at or near the junction of the two arms thereof with a guide liner or bushing which performs the twofold function of constituting a measuring point measurable with reference to the sides of the right-angled arms of the lower member for positively locating the center of the guide and thus the drill, relative to the work, and for accurately guiding the drill during the drilling operation. To guide drills accurately, and to render the device applicable for use with drills or the like of different diameters, I provide bushings of the same outside diameter but of different inside diameters so that any selected bushing may be positioned within and locked to the guide.

One of the outstanding advantages of my device is that it may be used with any machine capable of drilling holes, even though such machine be badly worn, and hence it is unnecessary to buy an expensive machine, such as a jig borer, for the drilling job. This is due to the fact that with my device the drill is always positively located in exact axial alinement with the hole to be drilled in the work.

Other advantages will appear as the description proceeds of the illustrative embodiment of my invention shown in the accompanying drawing. In the drawings:

Fig. 1 is a perspective view of my device set up for drilling holes of exact dimension in a piece of work.

Fig. 2 is a top plan view thereof, and

Fig. 3 is a perspective view of one of the sliding clamp blocks.

A device in accordance with my invention comprises a lower member generally indicated at 10 adapted to be clamped to or near the work 26 on the table 11. The member 10 has two side arms 12 and 13 disposed at right angles to each other and each having parallel inner and outer side walls. I form the top faces of the arms 12 and 13 for substantially their entire length with slots 14 and 15, preferably of inverted T-shaped cross section. Within the slots 14, 15 are slidably mounted similarly shaped blocks 16 each tapped and threaded at its upper end as at 17 to receive clamping bolts 18.

I provide an upper member generally indicated at 19 and comprising a pair of arms 20 and 21 which are preferably, but not necessarily, disposed at right angles to each other. The arms 20 and 21 are longitudinally slotted as at 22 and 23 to slidably receive the clamping bolts 18 so that the upper member can be adjusted transversely and longitudinally relative to the lower member 10 and the work 26. The member 19 has a guide member generally indicated at 24 which may most conveniently be located exteriorly of the figure defined by the arms 12, 13 and 20, 21, and which extends downwardly below the plane defined by the upper surface of the lower member 10 to facilitate the measurements, as later described.

A guide liner or bushing 30 is adapted to be centered over the hole or spot to be drilled (indicated at 25 on the work 26) and it serves both as a measuring point in measuring its relation to the sides of arms 12 and 13 of the lower member 10 and as a guide for a tool such as a drill, boring tool or the like 27 during operation of said tool. The guide member 24 comprises a hollow cylindrical portion 28, and a selected guide liner or bushing 30 is removably fastened in said portion by a lock screw 29 or the like. In accordance with my invention, I provide a plurality of different guide liners or bushings 30 of the same outside diameter but of different inside diameters so that different sized drills may be accurately guided when moved axially through the bore formed by the inside diameter of the selected liner or bushing.

In operating, in accordance with my invention, on a piece of work, I either mount my device on the work or close to it, both work and device being rigidly fastened to a flat plate not shown, which allows work, device and plate to be moved together as a unit and positioned so that the located bushing hole is exactly in line axially with the spindle of the machine which is to be used in operation upon the work 26. The work is generally set up parallel with the inner sides of the lower member 10 so that the guide liner or bushing 30 is centered over the hole to be drilled and the upper member 19 is then locked in that position. In practice, a hole may be located as accurately as is necessary, but in accordance with my invention, my device is used and before any change is made in its setting, a reading is taken to measure the distance of said hole to the outer or inner sides of arms 12 and 13 of the lower member 10.

Such measurements may be taken by using micrometers or size blocks and measuring from the outer surface of the liner or bushing 30 to the outer sides 12 and 13 of the lower member 10 or to the inner sides of said member. If an outside micrometer is used, such as is indicated in dotted lines at 31, then from the measurement should be subtracted the radius of the liner or bushing 30. Such a distance obviously should be added to a measurement secured by an inside micrometer or size blocks.

An additional hole or holes may thereafter be accurately located and drilled by loosening the clamping bolts 18 and moving the member 19 as required by additional measurements relative to the sides 12 and 13 of the bottom member 10 to center the liner or bushing 30 above the desired spot to be drilled.

To state the operation of the improved hole locating and drilling device of the present application, in other terms, it may be said that the piece of work 26 and the device of this application are both clamped to a suitable bottom plate of any preferred or well known construction, which plate is not shown in the accompanying drawings as it forms no part of the present invention. The operator next sets the guide bushing of the device in the position for the drilling of the first hole in the work piece, by using a standard pin through the hole of the bushing and positioning same from two sides of the work piece, using depth gauges or other suitable measuring means for this purpose. After the completion of the drilling of the first hole, and before the device is moved to the location for the drilling of the next hole, the operator measures the position of the guide bushing from either the inside or outside edge of the members 10 and 12 by means of a micrometer or similar measuring instrument. Having done this, it is an easy matter by simple addition or subtraction to position the guide bushing in proper location for the drilling of the second hole. When taking these measurements, it is more convenient for the operator, but not necessary, to consistently use either the inside of members 10 and 12, or the outside of said members, throughout the several positioning operations.

If any hole so drilled is required to be subsequently bored, the spindle chuck is elevated to raise the drill 27 above the guide liner or bushing 30, and the entire upper member 19 is removed without changing the position of the work or the lateral position of the spindle chuck in which the drill 27 is mounted. Then the drill 27 is removed from the spindle chuck and a boring head is placed therein and the boring operation is carried out to completion. The foregoing is also true of a reaming, tapping or any other operation of a nature which can be produced by a tool moving by rotation, such as counterboring, countersinking, outside turning, etc.

Obviously, the mechanical means shown and described may be of various design as long as they provide means for accurately guiding drills or the like to an accurately located spot to be drilled.

What I therefore claim and desire to secure by Letters Patent is:

1. In a device of the class described, a flat top right-angled lower block comprising a pair of arms disposed at right angles to each other, said block having slots extending longitudinally of the upper face of each of its arms, a clamp piece within each of said slots and readily slidable along the length of said slots, an upper block having longitudinally slotted flat arms disposed across the slotted upper faces of the lower block arms, adjustable bolts passing through the slots in the arms of the upper block and anchored within said clamp pieces to permit adjustment of said upper block with respect to said lower block and to retain said blocks in adjusted position, and a drill guide carried at the exterior angle of juncture of the arms of the upper block and adjustably positionable over a piece of work located within the interior angle of the lower block and below the plane of the bottom surface of the upper block.

2. In a device of the class described, a flat top right-angled lower block comprising a pair of arms disposed at right angles to each other, said block having T-slots extending longitudinally of the upper face of each of its arms, a clamp piece slidable in each of said slots, an angled upper block comprising a pair of connected, angularly disposed and longitudinally slotted flat arms disposable across the slotted upper faces of the lower block arms, bolts passing through the slots in the arms of the upper block and threaded into the clamp pieces in the T-slots of the lower block for permitting and holding the adjustment of said blocks relative to each other, a guide member positioned at the exterior angle of juncture of the arms of the upper block; and a removable replaceable guide liner or bushing mounted in said guide member and adapted to guide a drill passed therethrough, said guide member and its associated guide liner or bushing being adjustably positionable over a piece of work located within the interior angle of the lower block and below the plane of the bottom surface of the upper block.

3. A device of the class described in claim 1, in which the drill guide comprises an opening through the upper block adjacent the exterior angle of juncture of the arms of said upper block, and a bushing removably secured in said opening and having an inside diameter slightly greater than the outside diameter of a drill passed therethrough and guided thereby.

HENRY G. WHITMORE.

REFERENCES CITED

The following references are of record in the file of this patent:

UNITED STATES PATENTS

| Number | Name | Date |
|---|---|---|
| 2,124,118 | Okerfelt | July 19, 1938 |
| 2,342,033 | Barabas | Feb. 15, 1944 |
| 1,408,098 | Knapp et al. | Feb. 28, 1922 |
| 683,664 | Schramek et al. | Oct. 1, 1901 |
| 861,891 | Plant | July 30, 1907 |
| 1,018,153 | Bank | Feb. 20, 1912 |
| 1,235,031 | Holmgren | July 31, 1917 |
| 1,293,009 | Blaustein | Feb. 4, 1919 |
| 1,335,347 | Moulds | Mar. 30, 1920 |
| 1,871,178 | Hudson | Aug. 9, 1932 |
| 1,954,708 | Mass | Apr. 10, 1934 |
| 2,083,490 | Boker | June 8, 1937 |
| 2,166,692 | Ray | July 18, 1939 |
| 2,273,954 | Grass | Feb. 24, 1942 |
| 2,341,107 | MacDonald | Feb. 8, 1944 |